US012008411B2

(12) United States Patent
Parees et al.

(10) Patent No.: US 12,008,411 B2
(45) Date of Patent: *Jun. 11, 2024

(54) DYNAMIC CONTAINER-BASED APPLICATION RESOURCE TUNING AND RESIZING (71) Applicant: Red Hat, Inc., Raleigh, NC (US)

(72) Inventors: Benjamin M. Parees, Raleigh, NC (US); Gabriel G. Montero, Raleigh, NC (US); Cesar A. Wong, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/222,165

(22) Filed: Apr. 5, 2021

(65) Prior Publication Data
US 2021/0224131 A1    Jul. 22, 2021

Related U.S. Application Data (63) Continuation of application No. 15/825,784, filed on Nov. 29, 2017, now Pat. No. 10,996,991.

(51) Int. Cl.
G06F 9/50 (2006.01)
G06F 9/48 (2006.01)

(52) U.S. Cl.
CPC .......... *G06F 9/5055* (2013.01); *G06F 9/4881* (2013.01); *G06F 9/5016* (2013.01)

(58) Field of Classification Search
None
See application file for complete search history.

(56) References Cited

U.S. PATENT DOCUMENTS 8,707,304 B2    4/2014 Ashok et al.
8,954,309 B2    9/2015 B'Far et al.
9,274,811 B1*   3/2016 Reeves ................ G06F 9/5077
9,459,894 B2   10/2016 Bobroff et al.
(Continued)

FOREIGN PATENT DOCUMENTS

WO    2012123871 A1    9/2012

OTHER PUBLICATIONS

Al-Dhuraibi, "Automatic Vertical Elasticity of Docker Containers with Elasticdocker", IEEE (Year: 2017).*
(Continued)

*Primary Examiner* — Wynuel S Aquino
(74) *Attorney, Agent, or Firm* — Dority & Manning, P.A.

(57) ABSTRACT

Dynamic container-based application resource tuning and resizing is disclosed. One or more container resource constraint values associated with a first container are accessed. One or more application resource constraint values based on the one or more container resource constraint values are determined. A first application execution of an application is initiated in the first container. The one or more application resource constraint values are provided to the first application execution. An analysis of a plurality of resource usage metrics generated during the first application execution of the application is performed. Each resource usage metric quantifies a use of a corresponding resource associated with the first container during the first application execution. One or more optimized container resource constraint values are determined based on the analysis.

19 Claims, 9 Drawing Sheets

(56) References Cited

U.S. PATENT DOCUMENTS

| | | | |
|---|---|---|---|
| 9,529,611 B2 | 12/2016 | McDougall et al. | |
| 9,804,890 B1 | 10/2017 | Pai et al. | |
| 2011/0265081 A1 | 10/2011 | Lucovsky et al. | |
| 2013/0074091 A1 | 3/2013 | Xavier et al. | |
| 2014/0337837 A1* | 11/2014 | Padala | G06F 9/5005 718/1 |
| 2015/0249707 A1* | 9/2015 | Morgan | H04L 67/1001 709/226 |
| 2015/0301824 A1* | 10/2015 | Patton | G06F 16/00 717/122 |
| 2015/0378831 A1* | 12/2015 | Tarasuk-Levin | G06F 11/1484 714/15 |
| 2017/0199770 A1* | 7/2017 | Peteva | G06F 9/5088 |
| 2017/0200091 A1* | 7/2017 | Britton | G06N 20/00 |
| 2018/0006886 A1* | 1/2018 | Dhanakshirur | H04L 41/0896 |
| 2018/0336113 A1* | 11/2018 | Asawa | G06F 11/3452 |
| 2019/0163536 A1 | 5/2019 | Parees et al. | |

OTHER PUBLICATIONS

Author Unknown, "Oracle Fusion Middleware Tuning Performance of Oracle WebLogic Server," Oracle Help Center, 2015, Oracle, 8 pages.

Author Unknown, "Tuning the IBM virtual machine for Java," IBM Knowledge Center, www.ibm.com/support/knowledgecenter/en/SSAW57_8.5/com.ibm.websphere.nd.doc/ae/tprf_tunejvm_v61.html, accessed Aug. 30, 2017, 11 pages.

Al-Dhuraibi,Y. et al., "Autonomic Vertical Elasticity of Docker Containers with Elasticdocker," 2017 IEEE 10th International Conference on Cloud Computing, Honolulu, CA, USA (Jun. 25, 2017-Jun. 30, 2017), 8 pages.

Simon, "Dynamically setting the java heap size at runtime," Biology, Tech, Computing, whatever . . . , Jul. 2011, Proteo.me.uk, 4 pages.

Non-Final Office Action for U.S. Appl. No. 15/825,784, dated Jun. 13, 2019, 18 pages.

Final Office Action for U.S. Appl. No. 15/825,784, dated Dec. 30, 2019, 22 pages.

Advisory Action and AFCP 2.0 Decision for U.S. Appl. No. 15/825,784, dated Mar. 18, 2020, 3 pages.

Non-Final Office Action for U.S. Appl. No. 15/825,784, dated Jun. 18, 2020, 18 pages.

Final Office Action for U.S. Appl. No. 15/825,784, dated Oct. 15, 2020, 19 pages.

Notice of Allowance for U.S. Appl. No. 15/825,784, dated Jan. 6, 2021, 8 pages.

\* cited by examiner

DYNAMIC CONTAINER-BASED APPLICATION RESOURCE TUNING AND RESIZING

RELATED APPLICATION

This application is a continuation of co-pending U.S. patent application Ser. No. 15/825,784, filed on Nov. 29, 2017, entitled "DYNAMIC CONTAINER-BASED APPLICATION RESOURCE TUNING AND RESIZING," which is hereby incorporated herein by reference in its entirety.

TECHNICAL FIELD

The examples relate generally to containerization, and in particular, to dynamic container-based application resource tuning and resizing.

BACKGROUND

The use of containerization technologies is increasingly popular, particularly in cloud environments. Containers, among other advantages, facilitate isolation of application processes using substantially less resources than that required by isolation implemented via the use of virtual machines.

SUMMARY

The examples implement dynamic container-based application resource tuning and resizing. In some examples, a tuner translates container resource constraint values into application resource constraint values and initiates the application to use the application resource constraint values. A container constraint setter monitors resource usage metrics generated during the execution of the application. Based on the resource usage metrics, the container constraint setter determines optimized container resource constraint values, and causes the initiation of the application in a new container with the optimized container resource constraint values.

In one example a method is provided. The method includes accessing one or more container resource constraint values associated with a first container. The method further includes determining, by the computing device, one or more application resource constraint values based on the one or more container resource constraint values. The method further includes initiating a first application execution of an application in the first container. The method further includes providing the one or more application resource constraint values to the first application execution. The method further includes performing an analysis of a plurality of resource usage metrics generated during the first application execution of the application, each resource usage metric quantifying a use of a corresponding computing resource associated with the first container during the first application execution. The method further includes determining one or more optimized container resource constraint values based on the analysis.

In another example a computing device is provided. The computing device includes a memory and a processor device coupled to the memory. The processor device is to access one or more container resource constraint values associated with a first container. The processor device is further to determine one or more application resource constraint values based on the one or more container resource constraint values. The processor device is further to initiate a first application execution of an application in the first container. The processor device is further to provide the one or more application resource constraint values to the first application execution. The processor device is further to perform an analysis of a plurality of resource usage metrics generated during the first application execution of the application, each resource usage metric quantifying a use of a corresponding computing resource associated with the first container during the first application execution. The processor device is further to determine one or more optimized container resource constraint values based on the analysis.

In another example a computer program product stored on a non-transitory computer-readable storage medium is provided. The computer program product includes instructions to cause a processor device to access one or more container resource constraint values associated with a first container. The instructions further cause the processor device to determine one or more application resource constraint values based on the one or more container resource constraint values. The instructions further cause the processor device to initiate a first application execution of an application in the first container. The instructions further cause the processor device to provide the one or more application resource constraint values to the first application execution. The instructions further cause the processor device to perform an analysis of a plurality of resource usage metrics generated during the first application execution of the application, each resource usage metric quantifying a use of a corresponding computing resource associated with the first container during the first application execution. The instructions further cause the processor device to determine one or more optimized container resource constraint values based on the analysis.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first application execution" and "second application execution," and does not imply a priority, a type, an importance, or other attribute, unless otherwise stated herein. As used herein and in the claims, the articles "a" and "an" in reference to an element refers to "one or more" of the element unless otherwise explicitly specified.

The use of containerization technologies is increasingly popular, particularly in cloud environments. Containers, among other advantages, facilitate isolation of application processes using substantially less resources than that required by isolation implemented via the use of virtual machines.

Computing resource constraints may be associated with a container, such as, by way of non-limiting example, via the use of container groups (i.e., cgroups). Some applications, however, are not aware of cgroups, and do not abide by the computing resource constraints designated by the cgroups. Other applications may be aware of cgroups, but there is no automated mechanism to determine whether the resource constraints implemented via cgroups is ideal for the application or not. Moreover, once a container is started, computing resource constraints implemented via cgroups are static and, thus, cannot be changed once the container has been started.

The examples implement dynamic container-based application resource tuning and resizing. In some examples, a tuner translates container resource constraint values into application resource constraint values and initiates the application to use the application resource constraint values. A container constraint setter monitors resource usage metrics generated during the execution of the application. Based on the resource usage metrics, the container constraint setter determines optimized container resource constraint values, and causes the initiation of the application in a new container with the optimized container resource constraint values.

Figure 1:
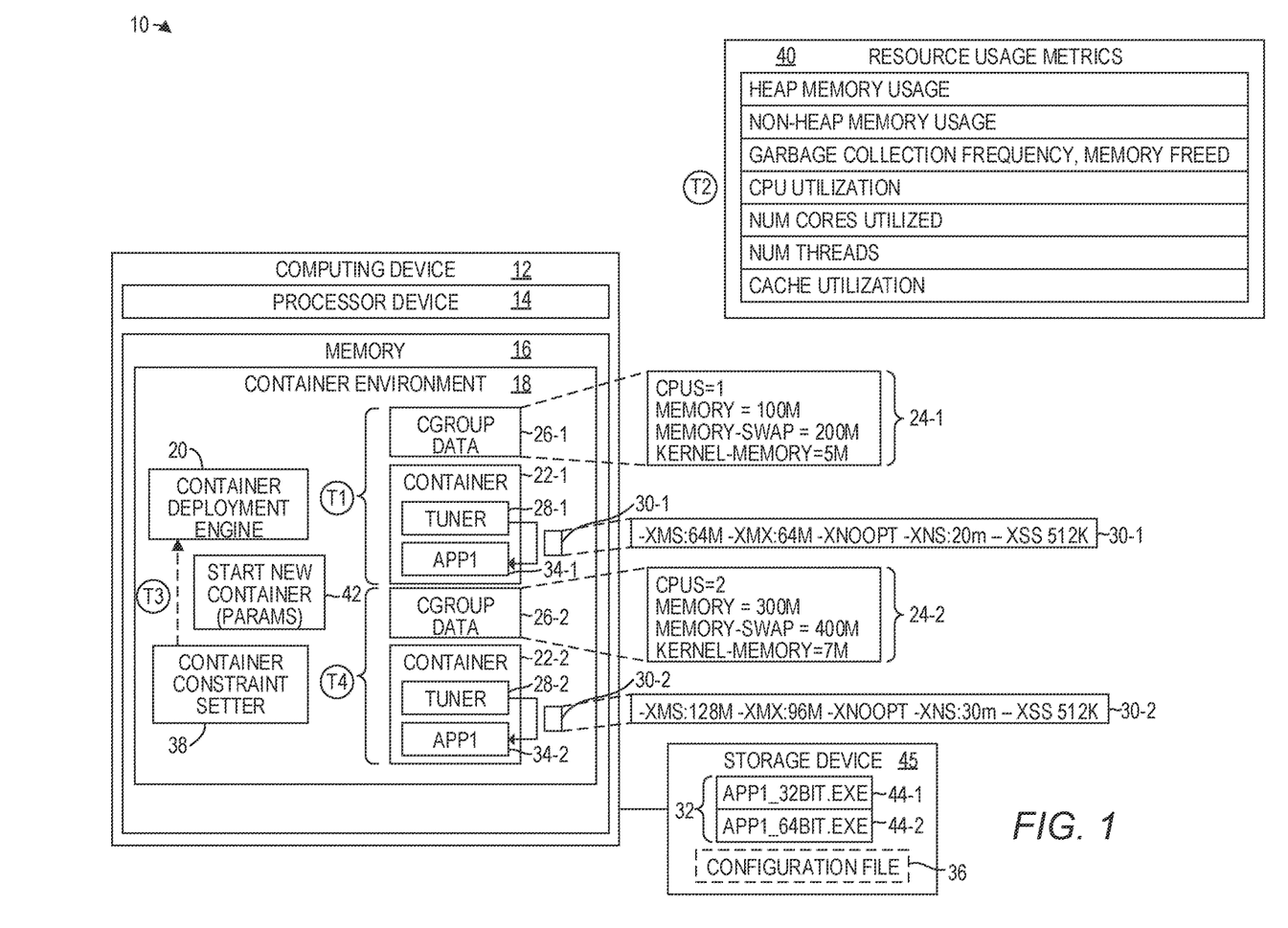
FIG. 1 is a block diagram of an environment according to one example.

FIG. 1 is a block diagram of an environment 10 according to one example. The environment 10 includes a computing device 12, which in turn has a processor device 14 and a memory 16. While for simplicity and illustration only a single computing device 12 is illustrated, the examples may be implemented using any number of computing devices. The memory 16 includes a container environment 18. The container environment 18 may utilize any conventional containerization technology, such as, by way of non-limiting example, Docker containerization technology or Kubernetes containerization technology. The phrase "container" as used herein refers to Linux containers. Although not illustrated, in some examples the container environment 18 may be implemented in a virtual machine.

A container deployment engine 20, such as, by way of non-limiting example, the Docker engine, is configured to initiate, or start, a first container 22-1. This may be in response to a request from an operator, an automated request from an application, or in response to some condition or criterion monitored by the container deployment engine 20 or some other application. Prior to initiating the first container 22-1, the container deployment engine 20 determines one or more container resource constraint values 24-1 for association with the first container 22-1. The container deployment engine 20 may determine the one or more container resource constraint values 24-1 from a predetermined configuration file, from information provided to the container deployment engine in conjunction with a request to initiate the first container 22-1, or any other mechanism.

The one or more container resource constraint values 24-1 may comprise any cgroup resource constraint value, including, by way of non-limiting example, a maximum memory constraint value, processor utilization, disk input/output rate, network priority, and a number of central processor units (CPUs) constraint value.

The container deployment engine 20 associates the one or more container resource constraint values 24-1 with the first container 22-1 by generating cgroup data 26-1, which includes the one or more container resource constraint values 24-1. The cgroup data 26-1 may comprise one or more cgroup files that operate as metadata for the first container 22-1.

The container deployment engine 20 may then initiate the first container 22-1. The first container 22-1 includes a tuner 28-1 which is initiated inside the first container 22-1. The tuner 28-1 is configured to access the one or more container resource constraint values 24-1 associated with the first container 22-1. In particular, the tuner 28-1 is configured to query the cgroup data 26-1 to determine the one or more container resource constraint values 24-1.

The tuner 28-1 is also configured to determine one or more application resource constraint values 30-1 based on the one or more container resource constraint values 24-1. The tuner 28-1 determines the one or more application resource constraint values 30-1 for use with an application 32. In particular, the tuner 28-1 translates, or otherwise maps, the container resource constraint values 24-1 to the one or more application resource constraint values 30-1. The one or more application resource constraint values 30-1 may differ depending on the particular application 32, or depending on a type of the particular application 32. For example, if the application 32 is, or utilizes, a Java virtual machine (VM), the one or more application resource constraint values 30-1 may comprise, by way of non-limiting example, a maximum heap size constraint value, an initial Java heap size constraint value, a Java thread stack size constraint value, a particular garbage collection algorithm constraint value, or a garbage collection frequency constraint value. For other types of applications 32, the one or more application resource constraint values 30-1 may comprise, by way of non-limiting example, a maximum amount of memory constraint value, a maximum amount of processor utilization constraint value, a maximum number of threads constraint value, a maximum amount of a cache memory constraint value, or the like.

As another example, for an Apache web server application 32, the one or more application resource constraint values 30-1 may comprise, by way of non-limiting example, values that identify which multi-processing module (MPM) to use (e.g., prefork MPM, worker MPM, event MPM), as well as values to configure that module, including a number of servers to initially start, a minimum and/or maximum number of spare servers, a maximum number of clients, and a maximum number of requests per child. These application resource constraint values 30-1 would be based on how much memory is available and the number of processors assigned to the first container 22-1.

The tuner 28-1 translates, or otherwise maps, the container resource constraint values 24-1 to the one or more application resource constraint values 30-1 in accordance with a desired algorithm, or a translation table, for example. In one example, the table may identify in one column potential ranges of constraint values for each of a plurality of different container resource constraint values, and each potential range of constraint values may correlate to one or more values for the one or more application resource constraint values 30-1.

For example, a container resource maximum memory constraint value 24-1 in a range between 2 GB and 3 GB may translate into a particular application resource maximum heap size constraint value 30-1 of 1 GB, an application resource initial Java heap size constraint value 30-1 of 512 MB, and an application resource Java thread stack size constraint value 30-1 of 512 MB.

As another example, an application resource maximum Java heap size constraint value 30-1 may be set to 50% of a container resource constraint value 24-1 that identifies the total amount of memory available to the first container 22-1. An application resource initial Java heap size constraint value 30-1 may be set to 10% of the total amount of memory available to the first container 22-1. An application resource number of garbage collector threads constraint value 30-1 may be set to 1 * the number of CPU cores identified by a container resource constraint value 24-1. The tuner 28-1 may choose to execute a 32-bit version of the application 32 if the application resource maximum Java heap size constraint value 30-1 is greater than or equal to 2 GB, and may choose to execute a 64-bit version of the application 32 otherwise. An application resource Java thread stack size constraint value 30-1 may be set to a value of 0.05 * the application resource maximum Java heap size constraint value 30-1 if a 32-bit application 32 will be executed, or to a value of 0.1 * the application resource maximum Java heap size constraint value 30-1 if a 64-bit application 32 will be executed.

After the tuner 28-1 determines the container resource constraint values 24-1, the tuner 28-1 initiates a first application execution 34-1 of the application 32 in the first container 22-1. The tuner 28-1 provides the one or more application resource constraint values 30-1 to the application 32. The tuner 28-1 may provide the one or more application resource constraint values 30-1 to the application 32 in any number of ways. In one example, the tuner 28-1 generates a configuration file 36 used by the application 32 that contains the one or more application resource constraint values 30-1. When the first application execution 34-1 initiates, the first application execution 34-1 is configured to read the configuration file 36, and execute within the one or more application resource constraint values 30-1 identified in the configuration file 36. In another example, the tuner 28-1 provides the one or more application resource constraint values 30-1 to the application 32 as runtime parameters when initiating the first application execution 34-1 of the application 32 in the first container 22-1.

The container environment 18 includes a container constraint setter 38 that is configured to generate a plurality of resource usage metrics 40 during the first application execution 34-1 of the application 32. Each resource usage metric 40 quantifies a use of a corresponding computing resource associated with the first container 22-1 during the first application execution 34-1. The resource usage metrics 40 may include, for example, heap memory usage, non-heap memory usage, garbage collection frequency, central processing unit (CPU) utilization, number of cores used, number of threads, cache utilization, total memory usage, or the like. In some examples, the resource usage metrics may be generated via the use of the "docker stats" command, which returns resource metrics that include CPU utilization, memory usage/limit, percentage of overall memory used, net input/output (I/O), and block I/O. Alternatively, or additionally, the resource usage metrics 40 may be generated via the use of the Docker application programming interface (API), which reports a live stream of CPU, memory, I/O, and network metrics, as described in detail at www.docker.com. The container constraint setter 38 may also utilize operating system metric commands to determine one or more of the resource usage metrics 40.

The container constraint setter 38 performs an analysis of the plurality of resource usage metrics 40 generated during the first application execution 34-1 of the application 32. Based on the analysis, the container constraint setter 38 determines one or more optimized container resource constraint values 24-2.

As an example, if using a Java virtual machine application 32, if the resource usage metrics 40 indicate that heap memory usage+non-heap memory usage was consistently above 90% of the memory available to the first container 22-1, then an optimized container resource constraint value 24-2 may increase the amount of memory for the second container 22-2 by 20%. If the resource usage metrics 40 indicate that the CPU utilization is consistently >90%, an optimized container resource constraint value 24-2 may increase the available processing power of the container 22-2 by 25%. If the resource usage metrics indicate that garbage collection throughput in terms of memory freed per second is less than 30 MB, an optimized container resource constraint value 24-2 may increase the total amount of memory of the second container 22-2 by 25%.

The container constraint setter 38 causes the initiation of a second container 22-2 having the one or more optimized container resource constraint values 24-2 for a second application execution 34-2 of the application 32. In particular, in one example, the container constraint setter 38 causes the initiation of the second container 22-2 by sending a message 42 to the container deployment engine 20 with the optimized container resource constraint values 24-2 that directs the container deployment engine 20 to initiate the second container 22-2 with the one or more optimized container resource constraint values 24-2.

The container deployment engine 20 associates the one or more container resource constraint values 24-2 with the second container 22-2 by generating cgroup data 26-2, which includes the one or more container resource constraint values 24-2. The cgroup data 26-2 may comprise one or more cgroup files that operate as metadata for the second container 22-2.

The container deployment engine 20 then initiates the second container 22-2. The second container 22-2 includes a tuner 28-2 which is initiated inside the second container 22-2. The tuner 28-2 is initiated from the same executable as the tuner 28-1 and is configured to determine one or more optimized container resource constraint values 24-2 associated with the second container 22-2. In particular, the tuner 28-2 is configured to query the cgroup data 26-2 to determine the one or more optimized container resource constraint values 24-2.

The tuner 28-2 determines one or more optimized application resource constraint values 30-2 based on the one or more optimized container resource constraint values 24-2, as discussed above with regard to the determination of the one or more container resource constraint values 24-1. The tuner 28-2 initiates the second application execution 34-2 of the application 32 in the second container 22-2, and provides the one or more optimized application resource constraint values 30-2 to the second application execution 34-2.

After the initiation of the second container 22-2, the container deployment engine 20 terminates the first container 22-1. Waiting until after the initiation of the second container 22-2 before terminating the first container 22-1 may allow a seamless transition from the services provided by the first application execution 34-1 to the services provided by the second application execution 34-2. In other examples, the container deployment engine 20 may terminate the first container 22-1 prior to initiating the second container 22-2.

Through iterations of this process, the container constraint setter 38 iteratively determines more and more optimized container resource constraint values 24, and tuners 28 determine more and more optimized application resource constraint values 30.

In this example, the application 32 is executable from either of a first executable 44-1 or a second executable 44-2 stored on a storage device 45. The first executable 44-1 may require a different amount of computing resources to execute than the second executable 44-2. In this example, the first executable 44-1 is a 32-bit version of the application 32, and the second executable 44-2 is a 64-bit version of the application 32. The first executable 44-1 may utilize fewer memory resources, for example, but the second executable 44-2 may have a higher throughput. In some examples, the tuners 28-1, 28-2 determine which executable 44 from which the application 32 will be executed based on the one or more container resource constraint values 24-1, 24-2 associated with the first and second containers 22-1, 22-2, respectively. Thus, for example, based on the one or more container resource constraint values 24-1, the tuner 28-1 may initiate the first application execution 34-1 of the application 32 in the first container 22-1 from the first executable 44-1. Subsequently, based on the one or more optimized container resource constraint values 24-2, the tuner 28-2 may initiate the second application execution 34-2 of the application 32 in the second container 22-2 from the second executable 44-2.

For purposes of illustration and explanation, the examples are described using various functional processes, such as the container deployment engine 20, the tuners 28-1, 28-2, and the container constraint setter 38; however, it will be appreciated that the novel functionality implemented by the various functional processes could be implemented using any number of functional processes, including a fewer number or a greater number than disclosed herein, and the examples are not limited to the particular functional processes, or number of functional processes, disclosed herein. By way of non-limiting example, while for purposes of illustration the container constraint setter 38 is illustrated as being separate from the container deployment engine 20, in other examples the container constraint setter 38 may be a component within the container deployment engine 20.

Moreover, while for purposes of illustration functionality may be attributed herein to a specific functional process, such as the container deployment engine 20, the tuners 28-1, 28-2, or the container constraint setter 38, because the functional processes are, in operation, software and/or hardware components of the computing device 12, functionality implemented by such functional processes may be attributed herein to the computing device 12 generally. Additionally, in examples where the functional processes comprise software instructions that program the processor device 14 to carry out functionality discussed herein, functionality implemented by such functional processes may be attributed herein to the processor device 14.

Figure 2:
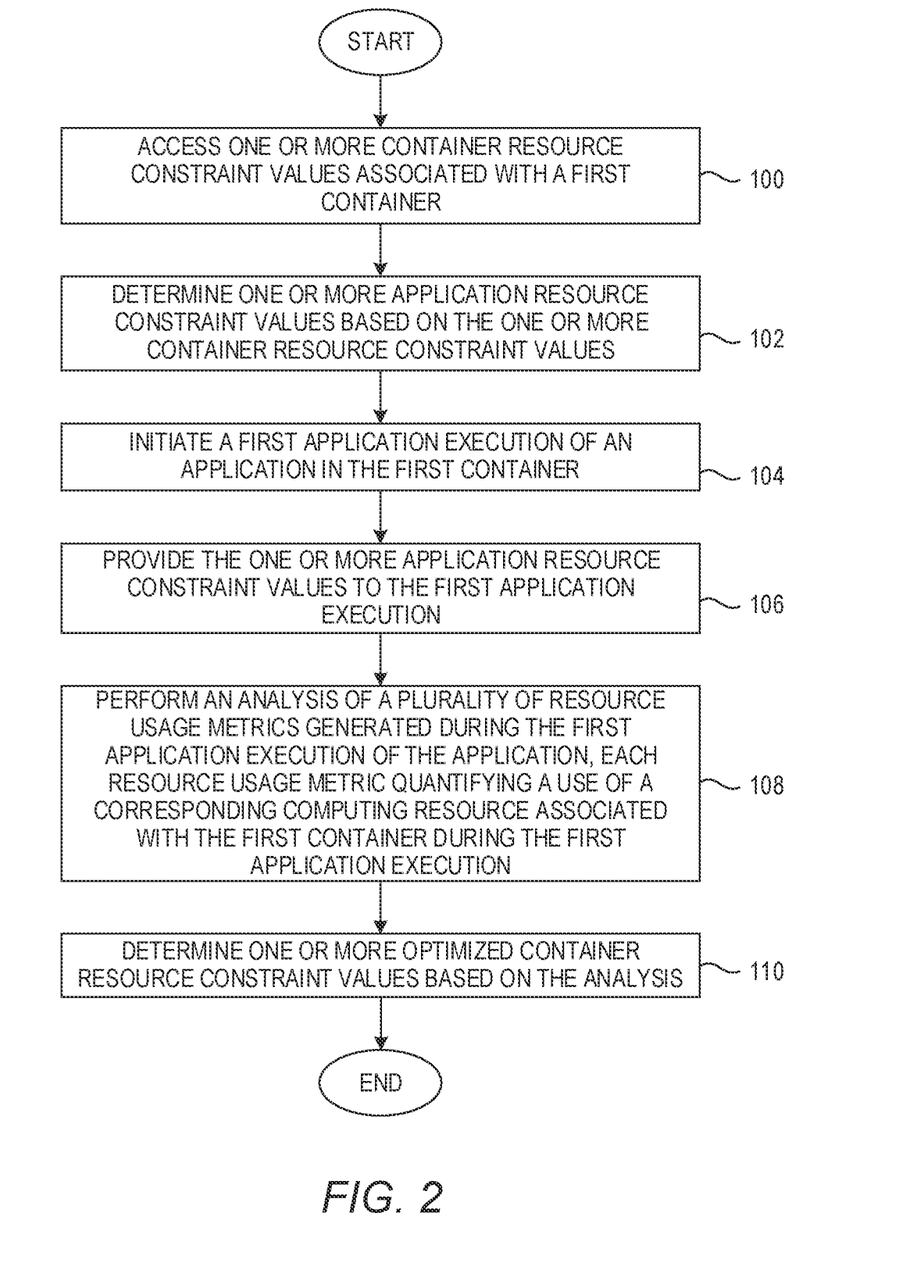
FIG. 2 is a flowchart of a method for generating optimized container resource constraint values according to one example.

FIG. 2 is a flowchart of a method for generating optimized container resource constraint values 24 according to one example. FIG. 2 will be discussed in conjunction with FIG. 1. The tuner 28-1 accesses the one or more container resource constraint values 24-1 associated with the first container 22-1 (FIG. 2, block 100).

The tuner 28-1 determines the one or more application resource constraint values 30-1 based on the one or more container resource constraint values 24-1 (FIG. 2, block 102). The tuner 28-1 initiates the first application execution 34-1 of the application 32 in the first container 22-1 (FIG. 2, block 104). The tuner 28-1 provides the one or more application resource constraint values 30-1 to the first application execution 34-1 (FIG. 2, block 106). The container constraint setter 38 performs an analysis of the plurality of resource usage metrics 40 generated during the first application execution 34-1 of the application 32. Each resource usage metric 40 quantifies a use of a corresponding computing resource associated with the first container 22-1 during the first application execution 34-1 (FIG. 2, block 108). The container constraint setter 38 determines one or more optimized container resource constraint values 24-1 based on the analysis (FIG. 2, block 110).

Figure 3A:
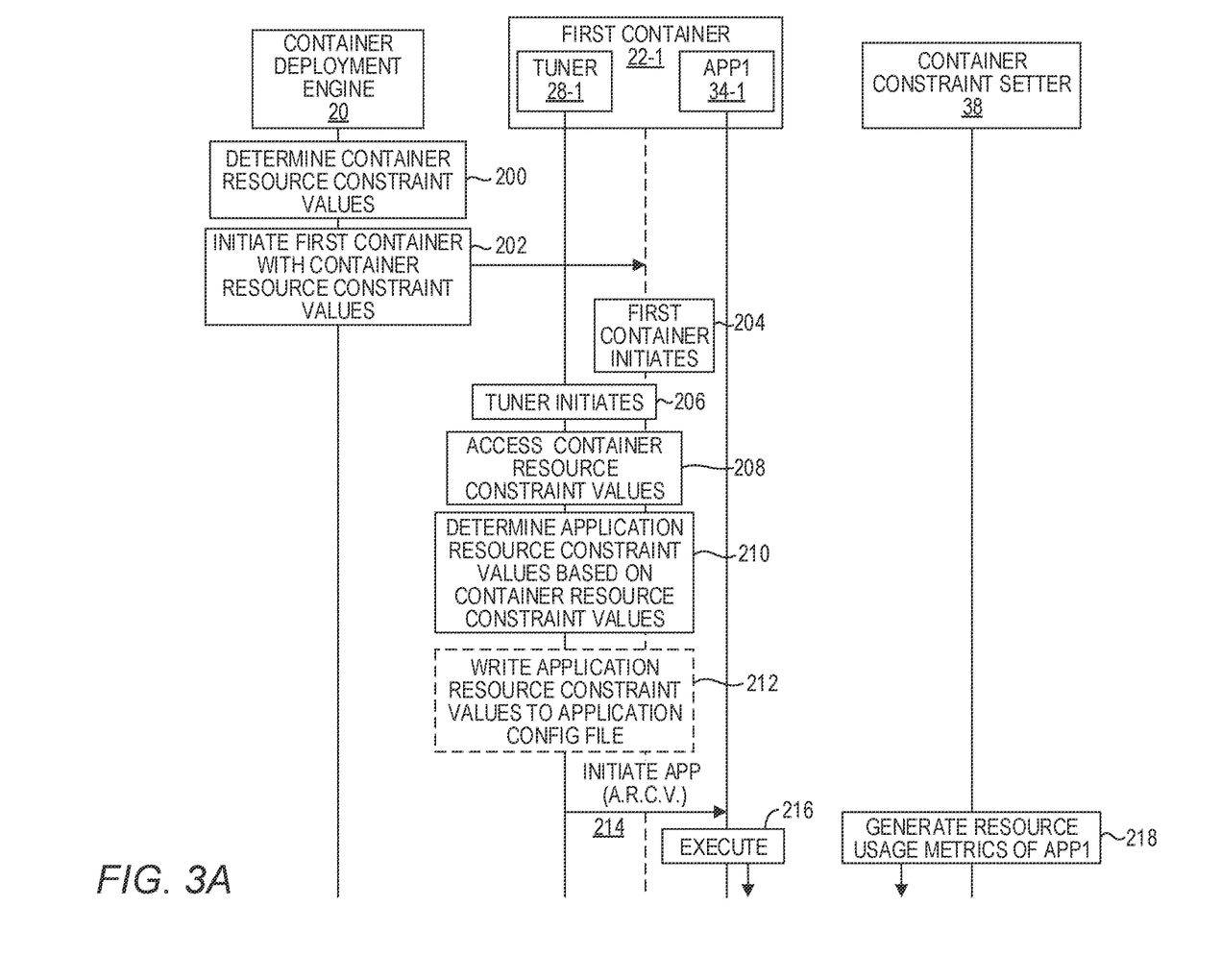
FIGS. 3A-3B illustrate a message flow diagram of a message flow and processing performed in the environment illustrated in FIG. 1, according to one example.

FIGS. 3A-3B illustrate a message flow diagram of a message flow and processing performed in the environment 10 according to one example. Referring first to FIG. 3A, the container deployment engine 20 initially determines preliminary container resource constraint values 24-1 (step 200). The container deployment engine 20 initiates the first container 22-1 with the container resource constraint values 24-1 (step 202). The first container 22-1 initiates (step 204). The tuner 28-1 then initiates (step 206). The tuner 28-1 accesses the container resource constraint values 24-1 (step 208). The tuner 28-1 determines the application resource constraint values 30-1 based on the container resource constraint values 24-1 (step 210). In one example, the tuner 28-1 writes the application resource constraint values 30-1 to a configuration file used by the first application execution 34-1 (step 212). The tuner 28-1 initiates the first application execution 34-1 of the application 32 (step 214). In some examples, the tuner 28-1 may pass the application resource constraint values 30-1 to the first application execution 34-1 via runtime parameters. The first application execution 34-1 begins to execute (step 216). The container constraint setter 38 begins to generate the resource usage metrics 40 of the first application execution 34-1 (step 218).

Figure 3B:
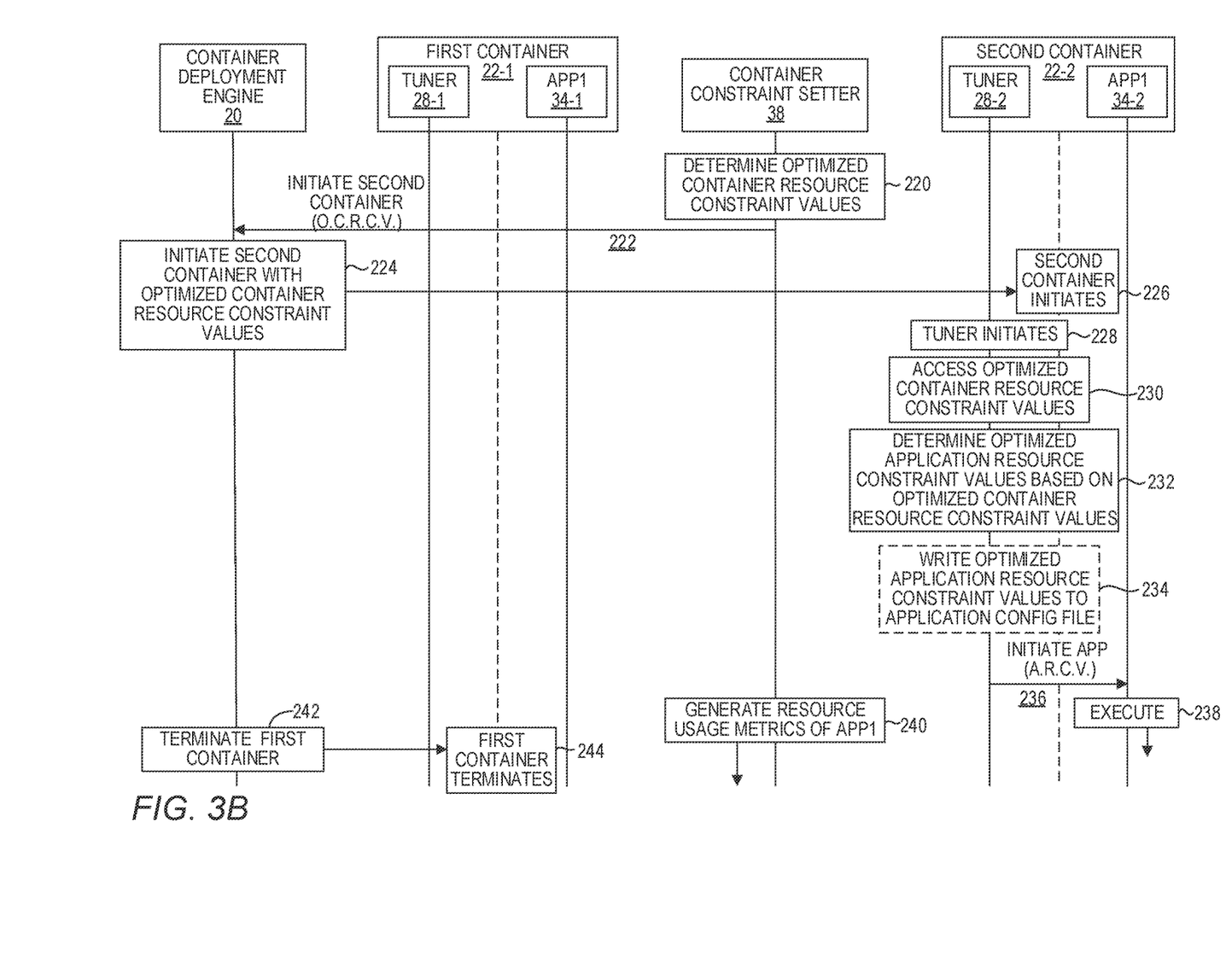

Referring now to FIG. 3B, the container constraint setter 38 determines optimized container resource constraint values 24-2 based on the analysis of the resource usage metrics 40 (step 220). The container constraint setter 38 sends the message 42 to the container deployment engine 20 to initiate the second container 22-2, and passes the optimized container resource constraint values 24-2 to the container deployment engine 20 (step 222). The container deployment engine 20 initiates the second container 22-2 (step 224). The second container 22-2 initiates (step 226). The tuner 28-2 initiates (step 228). The tuner 28-2 accesses the optimized container resource constraint values 24-2, and determines the optimized application resource constraint values 30-2 based on the optimized container resource constraint values 24-2 (steps 230-232). In one example, the tuner 28-2 writes the optimized application resource constraint values 30-2 to a configuration file used by the second application execution 34-2 (step 234). The tuner 28-2 initiates the second application execution 34-2 of the application 32 (step 236). In some examples, the tuner 28-2 may pass the optimized application resource constraint values 30-2 to the second application execution 34-2 via runtime parameters. The second application execution 34-2 begins to execute (step 238). The container constraint setter 38 begins to generate the resource usage metrics 40 of the second application execution 34-2 (step 240). The container deployment engine terminates the first container 22-1 (steps 242-244).

Figure 4:
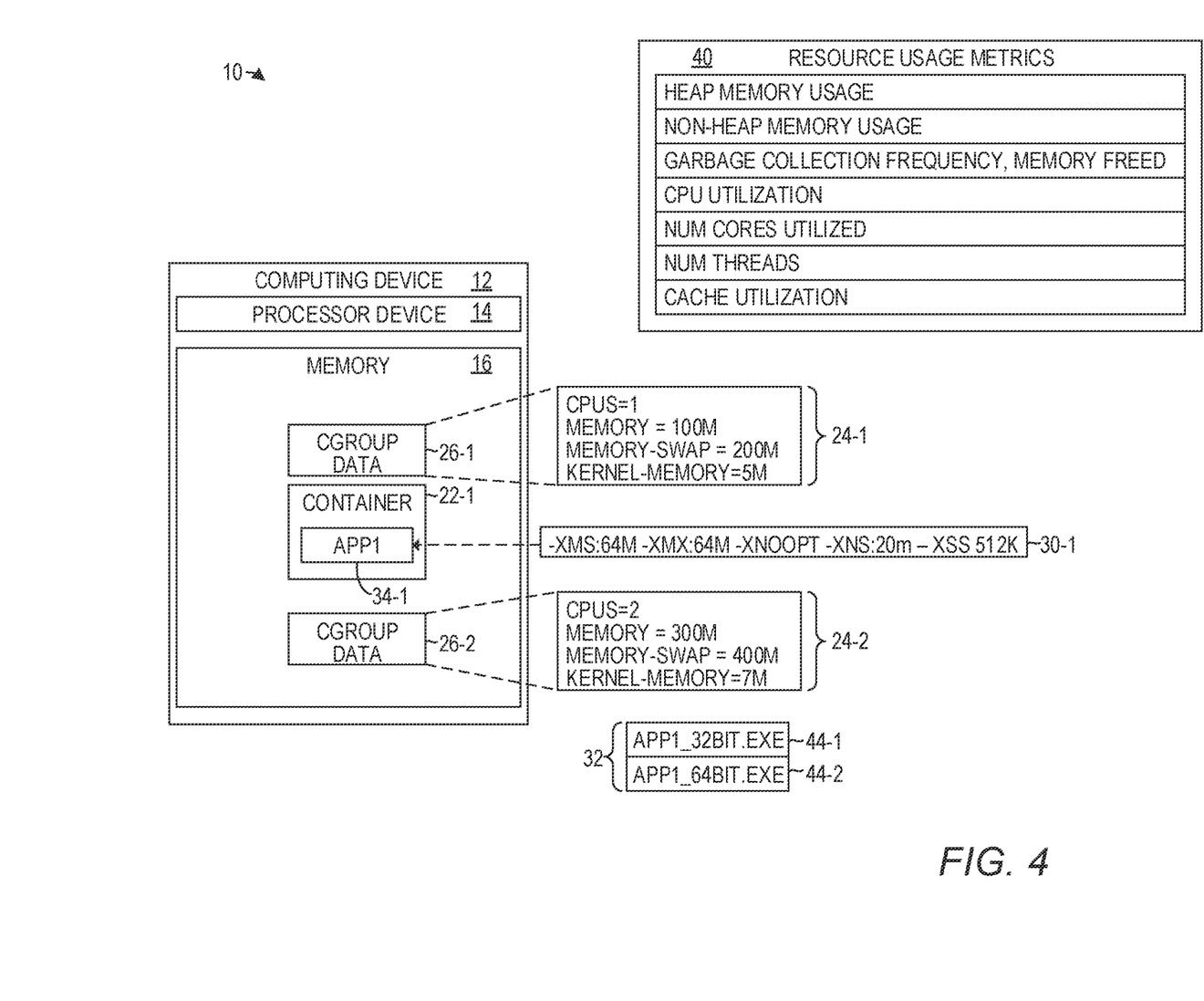
FIG. 4 is a simplified block diagram of the environment illustrated in FIG. 1 according to one example.

FIG. 4 is a simplified block diagram of the environment 10 illustrated in FIG. 1 according to one example. The computing device 12 includes the memory 16 and the processor device 14, which is coupled to the memory 16. The processor device 14 is to access the one or more container resource constraint values 24-1 associated with the first container 22-1. The processor device 14 is further to determine the one or more application resource constraint values 30-1 based on the one or more container resource constraint values 24-1. The processor device 14 is further to initiate the first application execution 34-1 of the application 32 in the first container 22-1. The processor device 14 is further to provide the one or more application resource constraint values 30-1 to the first application execution 34-1. The processor device 14 is further to perform an analysis of a plurality of resource usage metrics 40 generated during the first application execution 34-1 of the application 32. Each resource usage metric 40 quantifies a use of a corresponding computing resource associated with the first container 22-1 during the first application execution 34-1. The processor device 14 is further to determine the one or more optimized container resource constraint values 24-2 based on the analysis.

Figure 5:
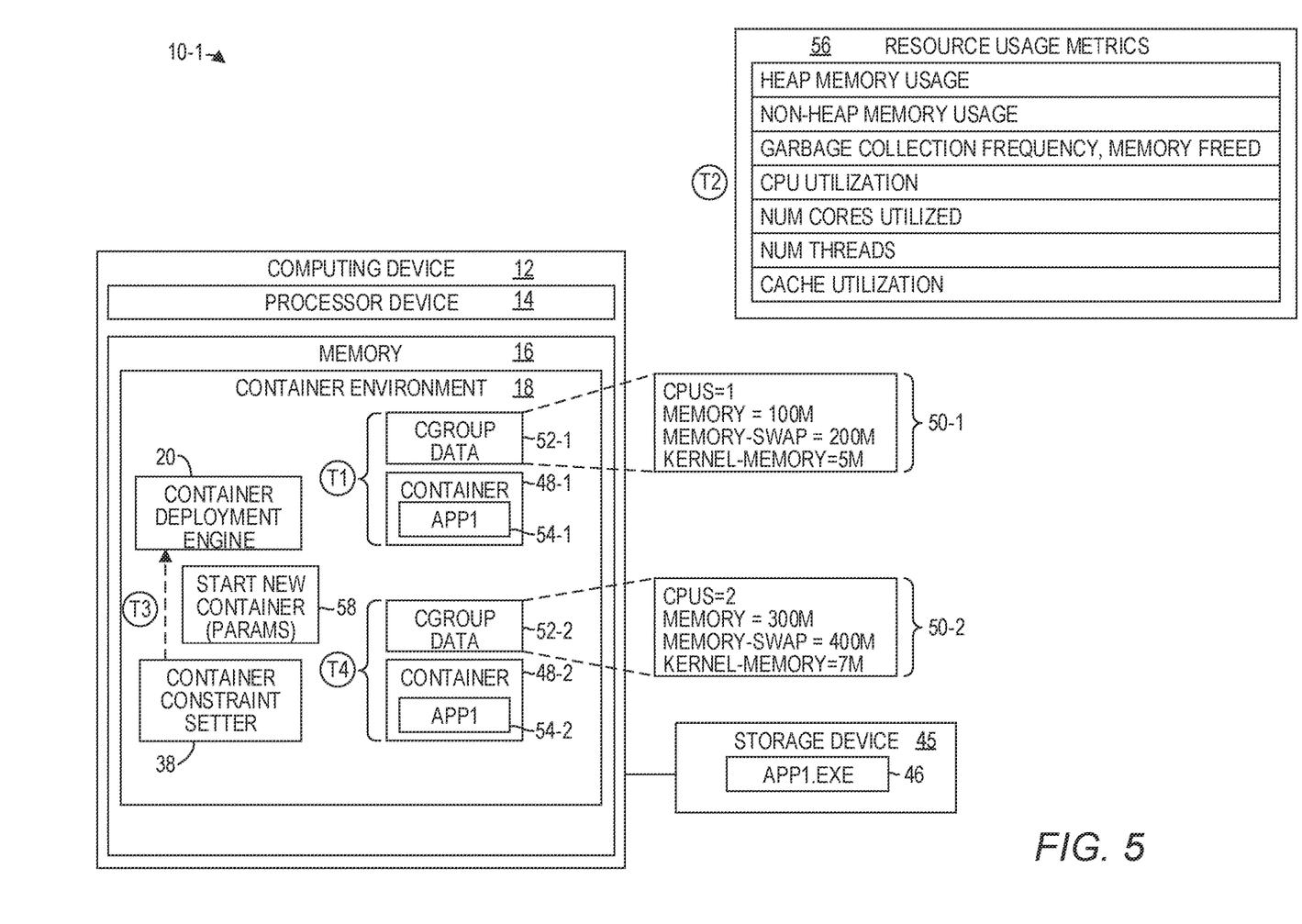
FIG. 5 is a block diagram of an environment according to another example.

FIG. 5 is a block diagram of an environment 10-1 according to another example. The environment 10-1 is substantially similar to the environment 10, except as otherwise discussed herein. In this example, an application 46 is configured to be aware of cgroups, and to execute within any container resource constraint values associated with a cgroup. The container deployment engine 20 initiates, or starts, a first container 48-1. This may be in response to a request from an operator, an automated request from an application, or in response to some condition or criterion monitored by the container deployment engine 20 or some other application. Prior to initiating the first container 48-1, the container deployment engine 20 determines one or more container resource constraint values 50-1 for association with the first container 48-1. The container deployment engine 20 may determine the one or more container resource constraint values 50-1 from a predetermined configuration file, from information provided to the container deployment engine 20 in conjunction with a request to initiate the first container 48-1, or any other mechanism.

The one or more container resource constraint values 50-1 may comprise any cgroup resource constraint, including, by way of non-limiting example, a maximum memory constraint value and a number of central processor units (CPUs) constraint value.

The container deployment engine 20 associates the one or more container resource constraint values 50-1 with the first container 48-1 by generating cgroup data 52-1, which includes the one or more container resource constraint values 50-1. The cgroup data 52-1 may comprise one or more cgroup files that operate as metadata for the first container 48-1.

The container deployment engine 20 may then initiate the first container 48-1. A first application execution 54-1 of the application 46 initiates. The first application execution 54-1 accesses the cgroup data 52-1 and obtains the one or more container resource constraint values 50-1. The first application execution 54-1 constrains its execution to the one or more container resource constraint values 50-1.

The container constraint setter 38 generates a plurality of resource usage metrics 56 during the first application execution 54-1 of the application 46. Each resource usage metric 56 quantifies a use of a corresponding computing resource associated with the first container 48-1 during the first application execution 54-1. The resource usage metrics 56 may include, for example, heap memory usage, non-heap memory usage, garbage collection frequency, CPU utilization, number of cores used, number of threads, cache utilization, total memory usage, or the like. As discussed above, the resource usage metrics 56 may be generated via the use of the "docker stats" command, which returns resource metrics that include CPU utilization, memory usage/limit, percentage of overall memory used, net I/O, and block I/O. Alternatively, or additionally, the resource usage metrics 40 may be generated via the use of the Docker API, which reports a live stream of CPU, memory, I/O, and network metrics, as described in detail at www.docker.com. The container constraint setter 38 may also utilize operating system metric commands to determine one or more of the resource usage metrics 56.

The container constraint setter 38 performs an analysis of the plurality of resource usage metrics 56 generated during the first application execution 54-1 of the application 46. Based on the analysis, the container constraint setter 38 determines one or more optimized container resource constraint values 50-2.

The container constraint setter 38 causes the initiation of a second container 48-2 having the one or more optimized container resource constraint values 50-2 for a second application execution 54-2 of the application 46. In particular, in one example, the container constraint setter 38 causes the initiation of the second container 48-2 by sending a message 58 to the container deployment engine 20 with the optimized container resource constraint values 50-2 that directs the container deployment engine 20 to initiate the second container 48-2 with the one or more optimized container resource constraint values 50-2.

The container deployment engine 20 associates the one or more container resource constraint values 50-2 with the second container 48-2 by generating cgroup data 52-2, which includes the one or more container resource constraint values 50-2. The cgroup data 52-2 may comprise one or more cgroup files that operate as metadata for the second container 48-2.

The container deployment engine 20 then initiates the second container 48-2. The second application execution 54-2 initiates. The second application execution 54-2 accesses the cgroup data 52-2 and obtains the one or more container resource constraint values 50-2.

Through iterations of this process, the container constraint setter 38 iteratively determines better and better optimized container resource constraint values 50 for the application 46.

Figure 6:
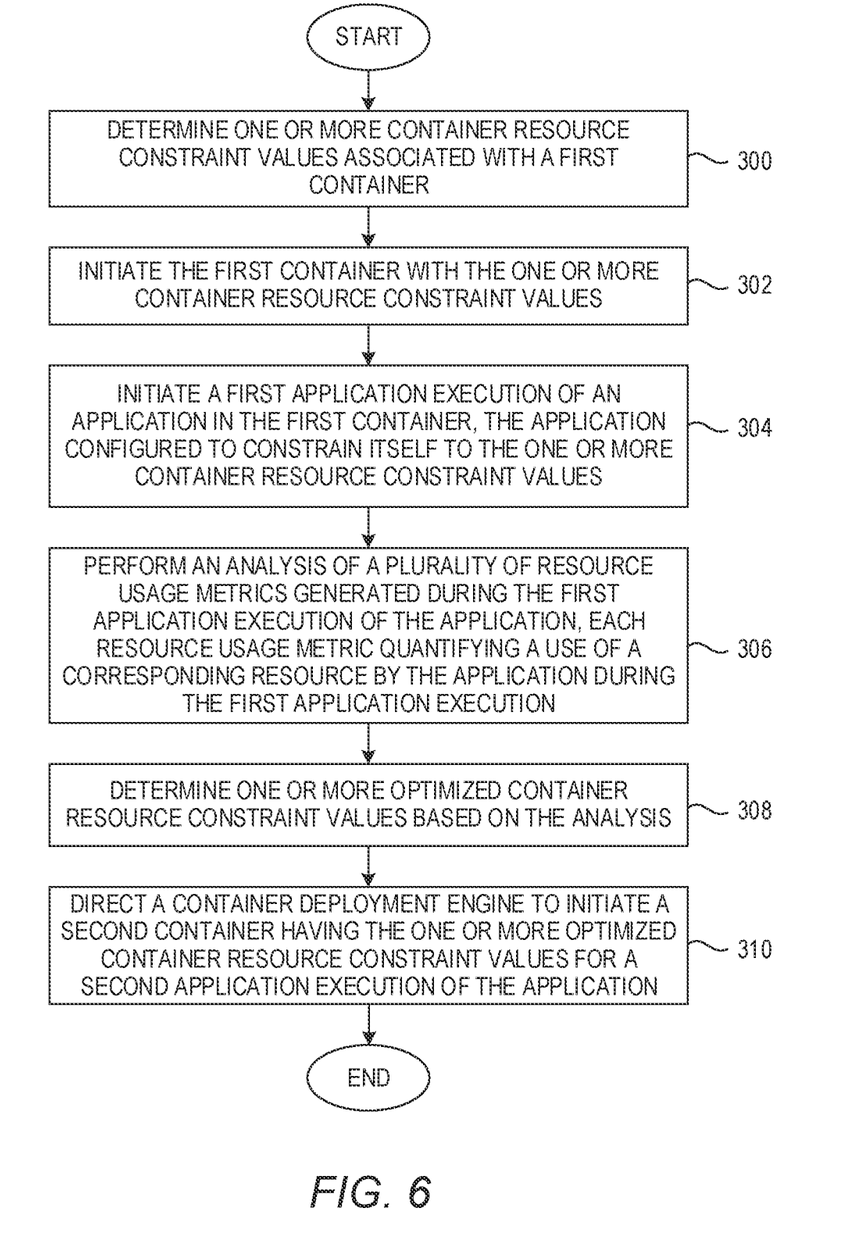
FIG. 6 is a flowchart of a method for determining optimized container resource constraint values according to one example.

FIG. 6 is a flowchart of a method for determining optimized container resource constraint values according to one example. FIG. 6 will be discussed in conjunction with FIG. 5. The container deployment engine 20 determines the one or more container resource constraint values 50-1 associated with the first container 48-1 (FIG. 6, block 300). The container deployment engine 20 initiates the first container 48-1 with the one or more container resource constraint values 50-1 (FIG. 6, block 302). The first container 48-1 initiates the first application execution 54-1 of the application 46 in the first container 48-1 (FIG. 6, block 304). The first application execution 54-1 is configured to constrain itself to the one or more container resource constraint values 50-1. The container constraint setter 38 performs an analysis of the plurality of resource usage metrics 56 generated during the first application execution 54-1 of the application 46, each resource usage metric 56 quantifying a use of a corresponding computing resource by the application 46 during the first application execution 54-1 (FIG. 6, block 306). The container constraint setter 38 determines one or more optimized container resource constraint values 50-2 based on the analysis (FIG. 6, block 308). The container constraint setter 38 directs the container deployment engine 20 to initiate the second container 48-2 having the one or more optimized container resource constraint values 50-2 for a second application execution 54-2 of the application 46 (FIG. 6, block 310).

Figure 7:
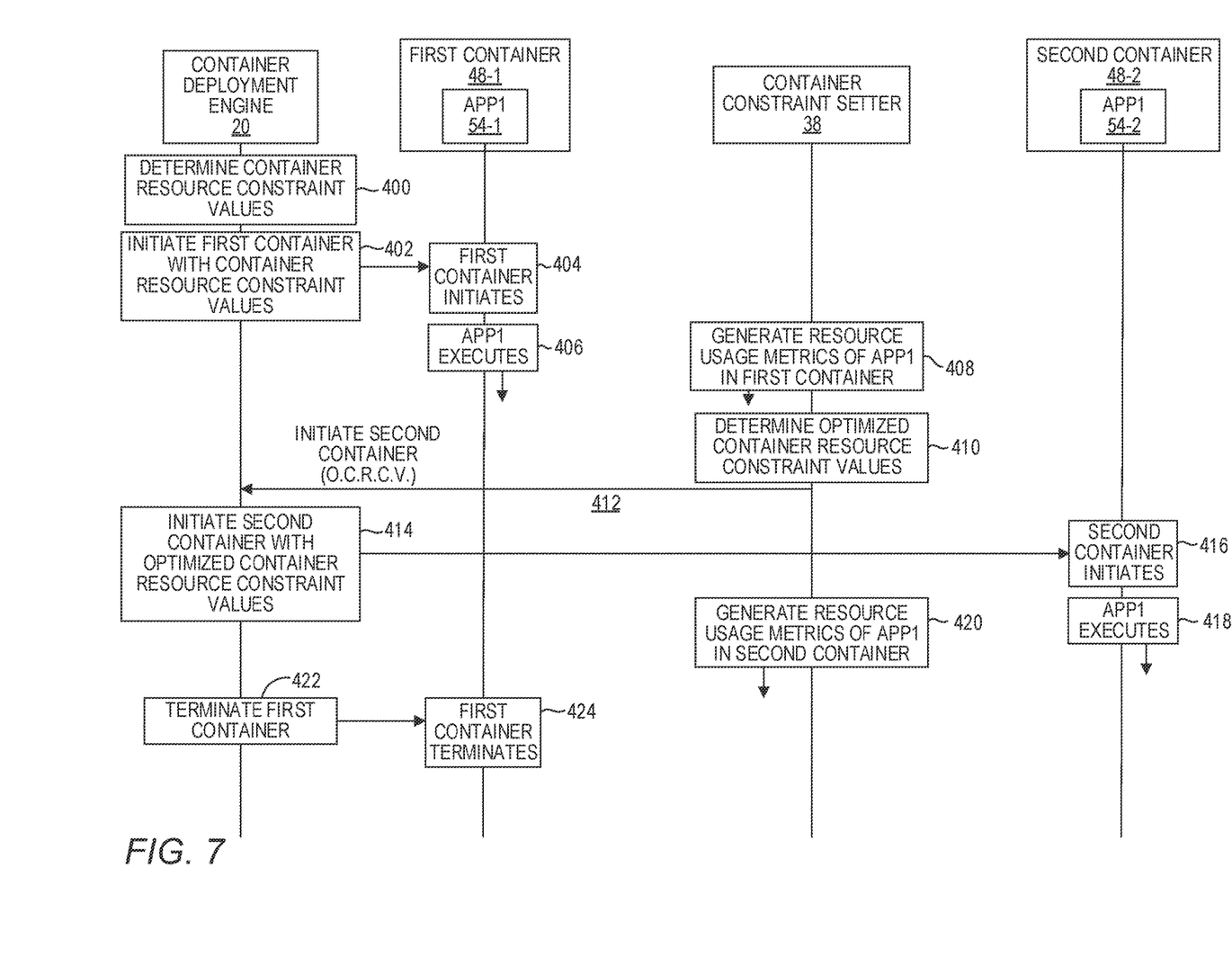
FIG. 7 illustrates a message flow diagram of a message flow and processing performed in the environment illustrated in FIG. 6, according to one example.

FIG. 7 illustrates a message flow diagram of a message flow and processing performed in the environment 10-1 illustrated in FIG. 5, according to one example. The container deployment engine 20 initially determines preliminary container resource constraint values 50-1 (step 400). The container deployment engine 20 initiates the first container 48-1 with the container resource constraint values 50-1 (step 402). The first container 48-1 initiates (step 404). The first application execution 54-1 of the application 46 initiates (step 406). The container constraint setter 38 begins to generate the resource usage metrics 56 of the first application execution 54-1 (step 408).

The container constraint setter 38 determines optimized container resource constraint values 50-2 based on the analysis of the resource usage metrics 56 (step 410). The container constraint setter 38 sends a message to the container deployment engine 20 to initiate the second container 48-2 and passes the optimized container resource constraint values 50-2 to the container deployment engine 20 (step 412). The container deployment engine 20 initiates the second container 48-2 (step 414). The second container 48-2 initiates (step 416). The second application execution 54-2 of the application 46 initiates (step 418). The container constraint setter 38 begins to generate the resource usage metrics 56 of the second application execution 54-2 (step 420). The container deployment engine 20 terminates the first container 48-1 (steps 422-424).

Figure 8:
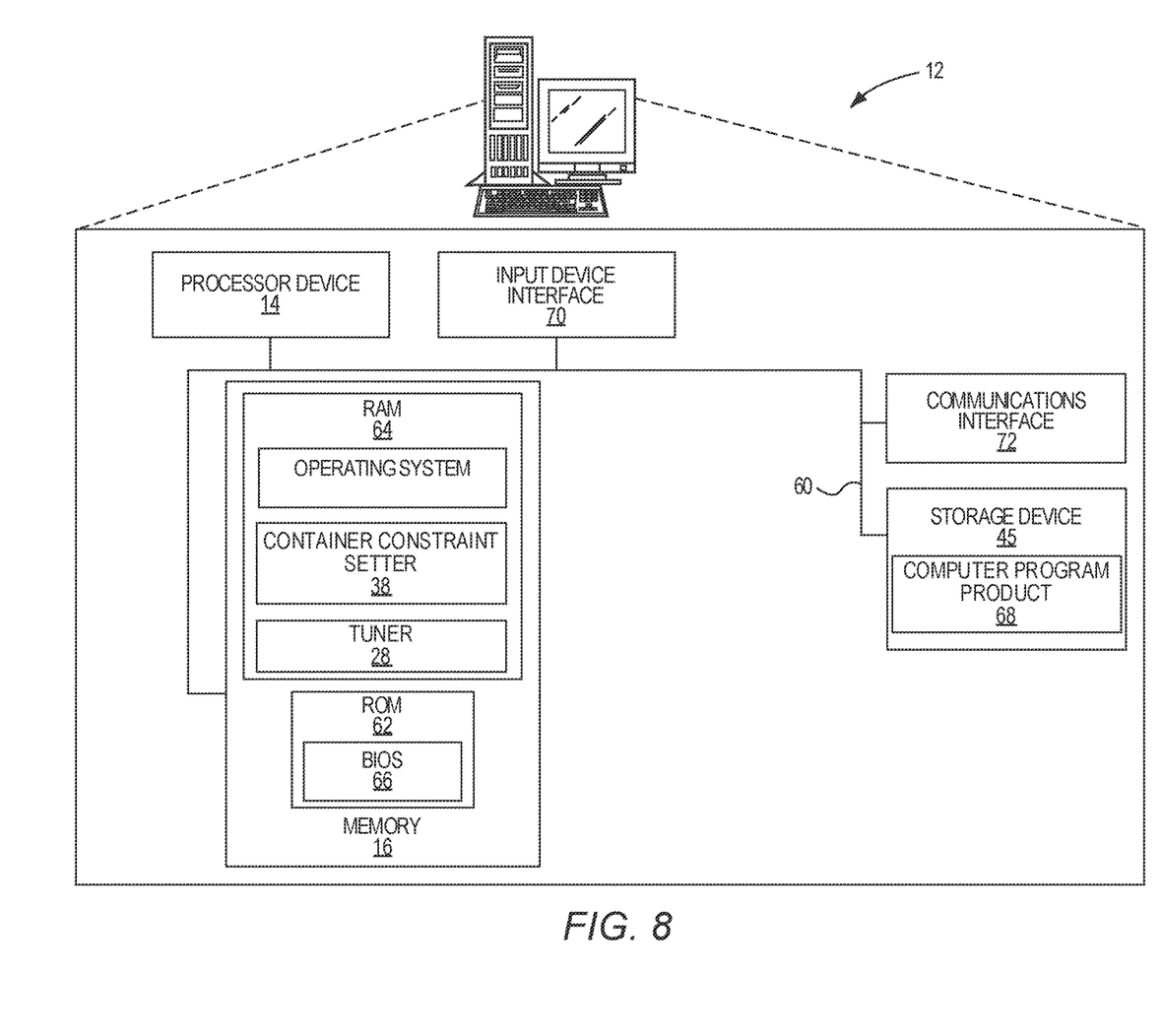
FIG. 8 is a block diagram of a computing device illustrated in FIG. 1 according to one example.

FIG. 8 is a block diagram of the computing device 12 suitable for implementing examples. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 60. The system bus 60 provides an interface for system components including, but not limited to, the system memory 16 and the processor device 14. The processor device 14 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The system memory 16 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the computing device 12. The volatile memory 64 may also include a high-speed RAM, such as static RAM, for caching data.

The computing device 12 may further include or be coupled to a non-transitory computer-readable storage medium such as the storage device 45, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 45 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 45 and in the volatile memory 64, including an operating system and one or more program modules, such as the container constraint setter 38 and the tuner 28, which may implement the functionality described herein in whole or in part.

All or a portion of the examples may be implemented as a computer program product 68 stored on a transitory or non-transitory computer-usable or computer-readable storage medium, such as the storage device 45, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the container constraint setter 38 and the tuner 28 in the volatile memory 64, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 14 through an input device interface 70 that is coupled to the system bus 60 but can be connected by other interfaces such as a parallel port, an Institute of Electrical and Electronic Engineers (IEEE) 1394 serial port, a Universal Serial Bus (USB) port, an infrared (IR) interface, and the like.

The computing device 12 may also include a communications interface 72 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
generating, by a computing device comprising a processor device, cgroup data to associate one or more container resource constraint values with a first container;
initiating, by the computing device, the first container with the one or more container resource constraint values, the first container comprising a tuner;
prior to initiating a first application execution of an application, querying, by the tuner, the cgroup data to determine the one or more container resource constraint values, wherein the one or more container resource constraint values indicate a corresponding one or more limits on computing resource usage by the first container;
translating, by the tuner, the one or more container resource constraint values into one or more application resource constraint values;
initiating, by the tuner, the first application execution of the application in the first container;
providing, by the tuner, the one or more application resource constraint values to the first application execution;
performing an analysis of a plurality of resource usage metrics generated during the first application execution of the application, each resource usage metric quantifying a use of a corresponding computing resource associated with the first container during the first application execution; and
determining one or more optimized container resource constraint values based on the analysis.

2. The method of claim 1 further comprising causing an initiation of a second container having the one or more optimized container resource constraint values for a second application execution of the application.

3. The method of claim 2 wherein causing the initiation of the second container further comprises sending a message to a container deployment engine with the one or more optimized container resource constraint values, the message directing the container deployment engine to initiate the second container with the one or more optimized container resource constraint values.

4. The method of claim 2 further comprising terminating the first container subsequent to causing the initiation of the second container.

5. The method of claim 2 further comprising:
determining one or more optimized application resource constraint values based on the one or more optimized container resource constraint values;
initiating the second application execution of the application in the second container; and
providing the one or more optimized application resource constraint values to the second application execution.

6. The method of claim 1 further comprising:
prior to initiating the first container, associating the one or more container resource constraint values with the first container.

7. The method of claim 6 wherein associating the one or more container resource constraint values with the first container comprises generating container group (cgroup) data for the first container that includes the one or more container resource constraint values.

8. The method of claim 1 wherein the one or more container resource constraint values comprise a maximum memory constraint value and a number of central processor units (CPUs) constraint value.

9. The method of claim 1 wherein the one or more application resource constraint values comprise one or more of a maximum heap size constraint value, an initial Java heap size constraint value, and a Java thread stack size constraint value.

10. The method of claim 1 wherein the one or more application resource constraint values comprise one or more of a maximum amount of memory constraint value, a maximum amount of processor utilization constraint value, a maximum number of threads constraint value, a maximum amount of a cache memory constraint value, or a maximum heap size constraint value.

11. The method of claim 1 further comprising generating the plurality of resource usage metrics by iteratively retrieving current resource usage metrics from a container deployment engine over a period of time.

12. The method of claim 1 wherein the application is executable from either of a first executable or a second executable, the first executable requiring a different amount of computing resources to execute than the second executable; and
wherein initiating the first application execution of the application in the first container further comprises:
determining, based on the one or more container resource constraint values associated with the first container, to initiate the application from the first executable; and
initiating the first application execution of the application in the first container from the first executable.

13. The method of claim 12 further comprising:
causing an initiation of a second container having the one or more optimized container resource constraint values for a second application execution of the application;
determining, based on the one or more optimized container resource constraint values associated with the second container, to initiate the application from the second executable; and
initiating the second application execution of the application in the second container from the second executable.

14. The method of claim 1 wherein providing the one or more application resource constraint values to the first application execution comprises generating a configuration file used by the first application execution that contains the one or more application resource constraint values.

15. The method of claim 1 wherein providing the one or more application resource constraint values to the first application execution comprises including the one or more application resource constraint values as runtime parameters when initiating the first application execution of the application in the first container.

16. A computing device, comprising:
a memory; and
a processor device coupled to the memory to:
generate cgroup data to associate one or more container resource constraint values with a first container;
initiate the first container with the one or more container resource constraint values, the first container comprising a tuner;
prior to initiating a first application execution of an application, query, by the tuner, the cgroup data to determine the one or more container resource constraint values, wherein the one or more container resource constraint values indicate a corresponding one or more limits on computing resource usage by the first container;

translate, by the tuner, the one or more container resource constraint values into one or more application resource constraint values;

initiate, by the tuner, the first application execution of the application in the first container;

provide, by the tuner, the one or more application resource constraint values to the first application execution;

perform an analysis of a plurality of resource usage metrics generated during the first application execution of the application, each resource usage metric quantifying a use of a corresponding computing resource associated with the first container during the first application execution; and determine one or more optimized container resource constraint values based on the analysis.

17. The computing device of claim 16 wherein the processor device is to further cause an initiation of a second container having the one or more optimized container resource constraint values for a second application execution of the application.

18. A computer program product stored on a non-transitory computer-readable storage medium and including instructions to cause a processor device to:

generate cgroup data to associate one or more container resource constraint values with a first container;

initiate the first container with the one or more container resource constraint values, the first container comprising a tuner;

prior to initiating a first application execution of an application, query, by the tuner, the cgroup data to determine the one or more container resource constraint values, wherein the one or more container resource constraint values indicate a corresponding one or more limits on computing resource usage by the first container;

translate, by the tuner, the one or more container resource constraint values into one or more application resource constraint values;

initiate, by the tuner, the first application execution of the application in the first container;

provide, by the tuner, the one or more application resource constraint values to the first application execution;

perform an analysis of a plurality of resource usage metrics generated during the first application execution of the application, each resource usage metric quantifying a use of a corresponding computing resource associated with the first container during the first application execution; and determine one or more optimized container resource constraint values based on the analysis.

19. The computer program product of claim 18 wherein the instructions further cause the processor device to cause an initiation of a second container having the one or more optimized container resource constraint values for a second application execution of the application.

* * * * *